US012356302B2

(12) United States Patent
Katayama et al.

(10) Patent No.: US 12,356,302 B2
(45) Date of Patent: Jul. 8, 2025

(54) INFORMATION PROCESSING APPARATUS AND CONTROL METHOD

(71) Applicant: Lenovo (Singapore) Pte. Ltd., Singapore (SG)

(72) Inventors: Yosuke Katayama, Kanagawa (JP); Qian Wang, Kanagawa (JP); Hidehisa Mori, Kanagawa (JP); Masahiro Tokuno, Kanagawa (JP)

(73) Assignee: Lenovo (Singapore) Pte. Ltd., Republic of (SG)

( * ) Notice: Subject to any disclaimer, the term of this patent is extended or adjusted under 35 U.S.C. 154(b) by 404 days.

(21) Appl. No.: 18/066,285

(22) Filed: Dec. 15, 2022

(65) Prior Publication Data
US 2023/0232197 A1    Jul. 20, 2023

(30) Foreign Application Priority Data

Jan. 17, 2022    (JP) ................................. 2022-005020

(51) Int. Cl.
*H04W 4/80* (2018.01)
*G08B 21/24* (2006.01)

(52) U.S. Cl.
CPC .............. *H04W 4/80* (2018.02); *G08B 21/24* (2013.01)

(58) Field of Classification Search
CPC ................................. H04W 4/80; G08B 21/24
USPC ....................................................... 455/41.2
See application file for complete search history.

(56) References Cited

U.S. PATENT DOCUMENTS

| 4,363,001 A * | 12/1982 | Suzuki ..................... H03G 5/04 330/144 |
| 6,414,675 B1 * | 7/2002 | Shen ..................... G06F 1/1616 710/14 |
| 8,928,796 B2 * | 1/2015 | Van Heugten ......... H04N 23/45 348/340 |
| 9,703,295 B1 * | 7/2017 | Neal, III ................. B64C 31/02 |
| 10,271,766 B1 * | 4/2019 | Parker, Jr. ............. A61B 5/0833 |
| 10,841,698 B1 * | 11/2020 | Janampally ............. G10L 25/51 |

(Continued)

FOREIGN PATENT DOCUMENTS

| JP | H09-035191 A | 2/1997 |
| JP | 2005-242585 A | 9/2005 |

(Continued)

*Primary Examiner* — April G Gonzales
(74) *Attorney, Agent, or Firm* — Osha Bergman Watanabe & Burton LLP

(57) ABSTRACT

An information processing apparatus includes a processor which executes an OS; a speaker which outputs a sound; a short-distance wireless communication unit which outputs first information indicating that a specific signal is received by short-distance wireless communication; an EC which outputs first sound data to output a sound in response to acquiring the first information output from the short-distance wireless communication unit; and an audio processing device which exclusively switches between the sound based on the first sound data output from the EC and a sound based on second sound data output from the processor by processing based on the OS in order to output either one of the sounds from the speaker. When acquiring the first information output from the short-distance wireless communication unit, the EC causes the audio processing device to output the sound based on the first sound data from the speaker.

7 Claims, 6 Drawing Sheets

(56) References Cited

U.S. PATENT DOCUMENTS

| | | | |
|---|---|---|---|
| 11,117,046 B1* | 9/2021 | Denbigh | A63F 3/00643 |
| 11,328,702 B1* | 5/2022 | Xiao | G10K 11/17873 |
| 2004/0215808 A1* | 10/2004 | Homma | H04L 5/14 |
| | | | 709/232 |
| 2008/0270975 A1* | 10/2008 | Brie | G06F 9/4492 |
| | | | 717/104 |
| 2013/0243213 A1* | 9/2013 | Moquin | H04M 9/082 |
| | | | 381/71.1 |
| 2015/0301338 A1* | 10/2015 | Van Heugten | G02B 27/0172 |
| | | | 345/8 |
| 2016/0013745 A1* | 1/2016 | North | H02P 7/2913 |
| | | | 318/460 |
| 2016/0100311 A1* | 4/2016 | Kumar | H04W 12/06 |
| | | | 726/7 |
| 2017/0011606 A1* | 1/2017 | Ceccon | G07G 1/0054 |
| 2018/0350357 A1* | 12/2018 | Pandey | G10L 15/20 |
| 2019/0171309 A1* | 6/2019 | Mims | G06F 3/041 |
| 2020/0400957 A1* | 12/2020 | Van Heugten | G02B 27/0172 |
| 2021/0279634 A1* | 9/2021 | ShafieiBavani | A61B 5/725 |

FOREIGN PATENT DOCUMENTS

| | | |
|---|---|---|
| JP | 2008-294688 A | 12/2008 |
| JP | 2015-518665 A | 7/2015 |

\* cited by examiner

INFORMATION PROCESSING APPARATUS AND CONTROL METHOD

CROSS-REFERENCE TO RELATED APPLICATIONS

This application claims priority to Japanese Patent Application No. 2022-5020 filed on Jan. 17, 2022, the contents of which are hereby incorporated herein by reference in their entirety.

BACKGROUND OF THE INVENTION

Field of the Invention

The present invention relates to an information processing apparatus and a control method.

Description of the Related Art

There are techniques for searching for lost or stolen objects. For example, in Japanese Unexamined Patent Application Publication No. H09(1997)-035191, there is disclosed such a technique that, when a person parked a car in a large parking lot at night or the like and left the car, although the person may forget where the person parked the car later, the person can press a portable transmitter switch, so that a specific radio wave assigned to the own car is transmitted, and the specific radio wave is received by a receiver placed on the own car to turn on car lights or sound a buzzer in order to make it possible for the person to confirm the position of the own car from a distance.

Further, in Japanese Unexamined Patent Application Publication No. 2008-294688, there is disclosed a technique for outputting an alarm sound to at least either one of a first mobile terminal and a second mobile terminal when the distance between the current position of the first mobile terminal and the current position of the second mobile terminal becomes equal to or more than a predetermined value in order to prevent a mobile terminal (information processing device) typified by a laptop personal computer from being stolen or lost.

However, even when a person tries to output a sound (for example, a beep sound) to an information processing device from a distance to find the information processing device such as a lost or stolen laptop personal computer, the sound may not be able to be output from system constraints. For example, when the system operating state is a normal operating state in which a sound is being output from a speaker under the control of the system, since the speaker, an audio device, and the like are occupied by the system, it may not be able to make the beep sound by remote control due to the constraints of the system. For example, a dedicated speaker for making the beep sound by remote control can be added to make the beep sound, but the addition of hardware has a large impact such as an increase in cost.

SUMMARY OF THE INVENTION

The present invention has been made in view of the above circumstances, and it is an object thereof to provide an information processing apparatus capable of outputting a sound by remote control using an existing speaker, and a control method therefor.

An information processing apparatus according to the first aspect of the present invention includes: a memory which temporarily stores a program of an OS (Operating System); a processor which executes the program of the OS; a speaker which outputs a sound; a short-distance wireless communication unit which outputs first information indicating that a specific signal is received when receiving the specific signal by short-distance wireless communication; an EC (Embedded Controller) which outputs first sound data to output a sound in response to acquiring the first information output from the short-distance wireless communication unit; and an audio processing device having a terminal to which the first sound data output from the EC is input and a terminal to which second sound data output from the processor by processing based on the OS is input to switch exclusively between the sound based on the first sound data and a sound based on the second sound data in order to output either one of the sounds from the speaker, wherein when acquiring the first information output from the short-distance wireless communication unit, the EC performs control to cause the audio processing device to output the sound based on the first sound data from the speaker.

The above information processing apparatus may also be such that, when acquiring the first information output from the short-distance wireless communication unit, the EC outputs a control signal to switch a sound to be output from the speaker from the sound based on the second sound data to the sound based on the first sound data, and the audio processing device has a control terminal to which the control signal output from the EC is input, and based on the control signal, the audio processing device switches the sound to be output from the speaker from the sound based on the second sound data to the sound based on the first sound data.

The above information processing apparatus may further be such that the control terminal is a terminal compatible with I2S (Inter-IC Sound) standard.

Further, the above information processing apparatus may be such that the audio processing device makes a request to the processor for switching control based on the control signal, the processor instructs the audio processing device to switch the sound to be output from the speaker from the sound based on the second sound data to the sound based on the first sound data in response to the request for the switching control from the audio processing device, and in accordance with the instruction from the processor, the audio processing device switches the sound to be output from the speaker from the sound based on the second sound data to the sound based on the first sound data.

Further, the above information processing apparatus may be such that the EC outputs second information to the processor in response to acquiring the first information output from the short-distance wireless communication unit, the processor instructs the EC to output the first sound data in response to acquiring the second information output from the EC, and in accordance with the instruction to output the first sound data from the processor, the EC outputs the first sound data.

Further, the above information processing apparatus may be such that, after outputting the control signal to switch the sound to be output from the speaker from the sound based on the second sound data to the sound based on the first sound data, when a predetermined condition is satisfied, the EC outputs a control signal to switch the sound to be output from the speaker from the sound based on the first sound data to the sound based on the second sound data.

Further, a control method for an information processing apparatus according to the second aspect of the present invention is a control method for an information processing apparatus including: a memory which temporarily stores a program of an OS (Operating System); a processor which executes the program of the OS; a speaker which outputs a sound; a short-distance wireless communication unit which performs short-distance wireless communication; an audio processing device; and an EC (Embedded Controller), the control method including: a step of causing the short-distance wireless communication unit to output first information indicating that a specific signal is received when receiving the specific signal by short-distance wireless communication; a step of causing the EC to output first sound data in order to output a sound in response to acquiring the first information output from the short-distance wireless communication unit; a step of causing the audio processing device to switch exclusively between a sound based on the first sound data and a sound based on second sound data in order to output either one of the sounds from the speaker, where the audio processing device has a terminal to which the first sound data output from the EC is input and a terminal to which the second sound data output from the processor by processing based on the OS is input; and a step in which when acquiring the first information output from the short-distance wireless communication unit, the EC performs control to cause the audio processing device to output, from the speaker, the sound based on the first sound data.

According to the above aspects of the present invention, the information processing apparatus can output a sound by remote control using an existing speaker regardless of the system operating state.

DETAILED DESCRIPTION OF THE INVENTION

Embodiments of the present invention will be described below with reference to the accompanying drawings.

First Embodiment

Figure 1:
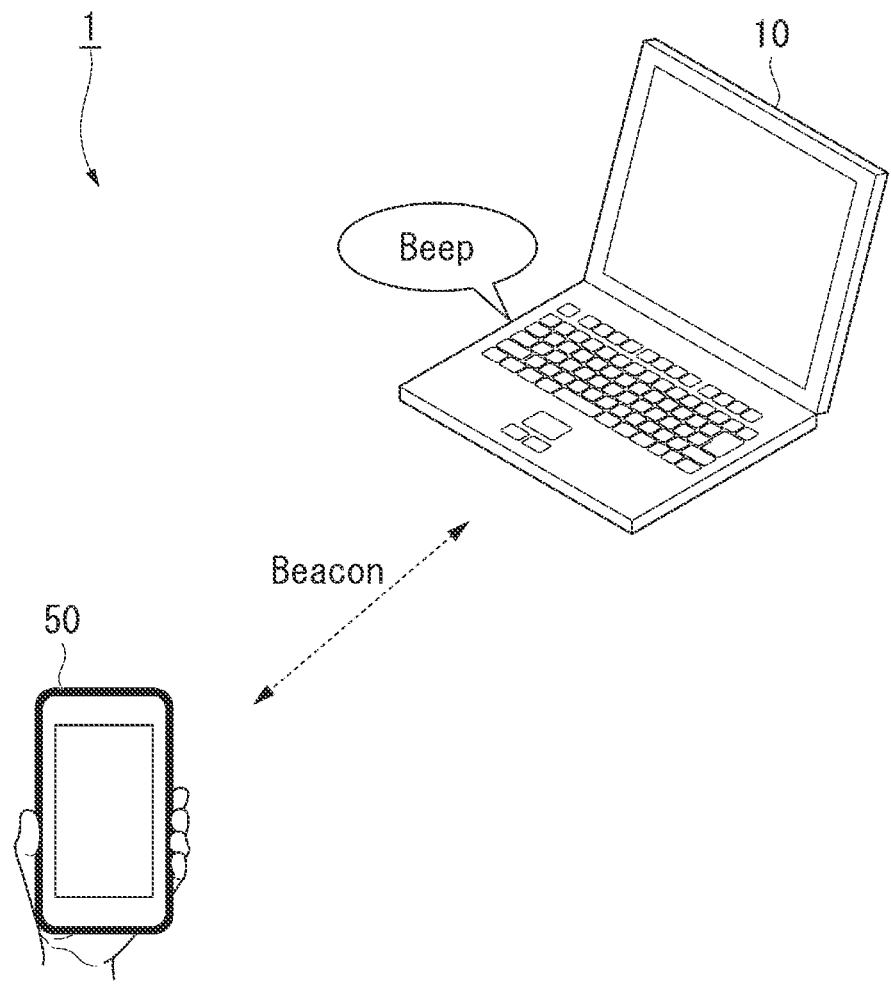
FIG. 1 is a diagram illustrating an example of the schematic configuration of an information processing system according to a first embodiment.

FIG. 1 is a diagram illustrating an example of the schematic configuration of an information processing system 1 according to the present embodiment. The information processing system 1 includes an information processing apparatus 10 and a portable terminal 50 (an example of a terminal device). The information processing apparatus 10 is an example of a computer device such as a laptop (clamshell) PC (Personal Computer). Since the information processing apparatus 10 can be moved to various locations regardless of indoors or outdoors and used, the information processing apparatus 10 may be lost or stolen. The portable terminal 50 is an example of a portable computer device such as a smartphone. The portable terminal 50 may also be a computer device such as a laptop (clamshell) PC (Personal Computer).

The portable terminal 50 and the information processing apparatus 10 pre-register each other's identification information as pairing information to enable communication between the portable terminal 50 and the information processing apparatus 10. For example, the portable terminal 50 and the information processing apparatus 10 can communicate with each other using a beacon for communication using the function of Bluetooth (registered trademark).

When the information processing apparatus 10 is lost or when the information processing apparatus 10 is stolen, a user can send a specific signal from the portable terminal 50 to the information processing apparatus 10 using the beacon to cause the information processing apparatus 10 to output a notification sound such as a beep sound. For example, the user can know the location of the information processing apparatus 10 by causing the information processing apparatus 10 to output a loud beep sound so that the lost or stolen information processing apparatus 10 can be found.

Here, the specific signal transmitted from the portable terminal 50 to the information processing apparatus 10 is called a "loss prevention tag" below. When the loss prevention tag is transmitted from the portable terminal 50 using the beacon, the information processing apparatus 10 receives the loss prevention tag to output the beep sound as long as the information processing apparatus 10 is within the reach of the beacon (for example, a range of about 100 m).

[Hardware Configuration of Information Processing Apparatus]

Figure 2:
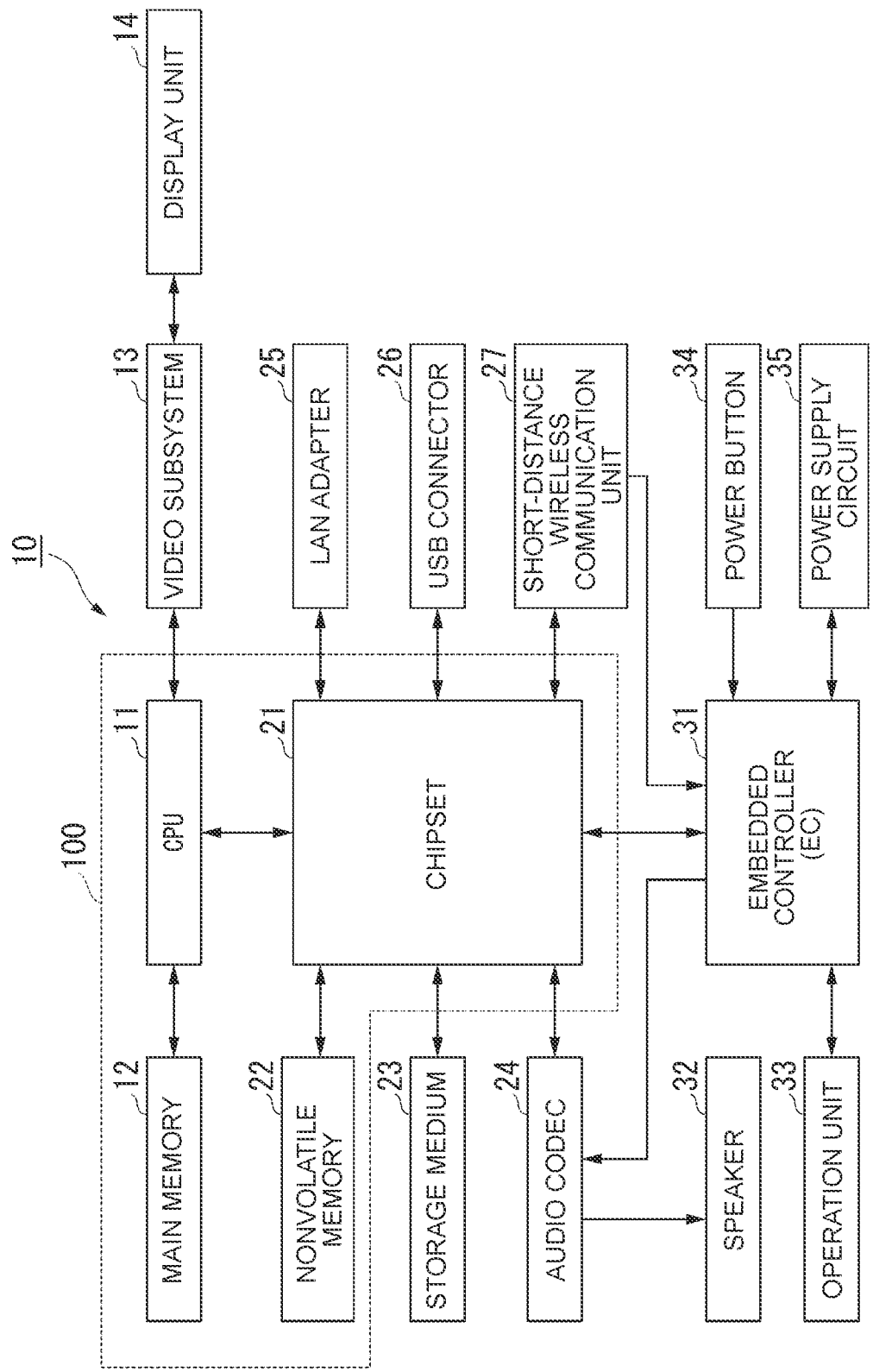
FIG. 2 is a block diagram illustrating a hardware configuration example of an information processing apparatus according to the first embodiment.

Referring next to FIG. 2, the main hardware configuration of the information processing apparatus 10 will be described. FIG. 2 is a block diagram illustrating an example of the hardware configuration of the information processing apparatus 10 according to the present embodiment.

The information processing apparatus 10 includes a CPU 11, a main memory 12, a video subsystem 13, a display unit 14, a chipset 21, a nonvolatile memory 22, a storage medium 23, an audio codec 24, a LAN adapter 25, a USB connector 26, a short-distance wireless communication unit 27, an embedded controller 31, a speaker 32, an operation unit 33, a power button 34, and a power supply circuit 35.

The CPU (Central Processing Unit) 11 executes various kinds of arithmetic processing by program control to control the entire information processing apparatus 10. For example, the CPU 11 executes processing based on an OS (Operating System) or a BIOS (Basic Input Output System).

The main memory 12 is a writable memory used as reading areas of execution programs of the CPU 11 or working areas to which processing data of the execution programs are written. The main memory 12 is composed, for example, of plural DRAM (Dynamic Random Access Memory) chips.

The video subsystem 13 is a subsystem for realizing functions related to image display, which includes a video controller. This video controller processes a drawing command from the CPU 11, writes processed drawing information into a video memory, reads this drawing information from the video memory, and outputs the drawing information to the display unit 14 as drawing data (display data).

The display unit 14 is configured, for example, to include a liquid crystal display or an organic EL display for displaying a display image based on the drawing data (display data) output from the video subsystem 13.

The chipset 21 builds bridges between the CPU 11 and various devices. For example, the chipset 21 includes controllers, such as USB, serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. For example, the nonvolatile memory 22, the storage medium 23, the audio codec 24, the LAN adapter 25, the USB connector 26, the short-distance wireless communication unit 27, and the embedded controller 31 are included as the plural devices.

The nonvolatile memory 22 is an electrically rewritable nonvolatile memory such as an EEPROM (Electrically Erasable Programmable Read Only Memory) or a flash memory. The nonvolatile memory 22 stores a BIOS program, setting data used by the BIOS, and the like.

The storage medium 23 is configured to include an HDD (Hard Disk Drive) or an SSD (Solid State Drive), and the like. For example, the storage medium 23 stores the OS, various drivers, various services/utilities, various programs such as applications, and various data used by the various programs.

The audio codec 24 is a codec device to encode or decode various sound data, which is connected to the chipset 21, the embedded controller 31, and the speaker 32. For example, the audio codec 24 outputs, from the speaker 32, a sound based on sound data input from the CPU 11 through the chipset 21 or a sound based on sound data input from the EC 31. Note that an unillustrated microphone may also be connected to the audio codec 24, and the audio codec 24 may also generate sound data based on a sound input through the microphone.

The LAN adapter 25 performs communication with other devices through a network by wire or wirelessly. The network is, for example, the Internet, a mobile phone network, a VPN (Virtual Private Network), a dedicated communication network, a WAN (Wide Area Network), a LAN (Local Area Network), A PSTN (Public Switched Telephone Network), or the like, or a communication network composed of a combination of these networks.

The USB connector 26 is a connector (connection terminal) to connect with various devices (peripheral devices) compatible with the USB standard. The USB connector 26 is connected to the USB controller included in the chipset 21, and configured as a USB port connectable with the various devices (peripheral devices) compatible with the USB standard.

The short-distance wireless communication unit 27 performs short-distance wireless communication with any other device (for example, the portable terminal 50) using a predetermined communication system. For example, the short-distance wireless communication unit 27 performs communication via Bluetooth (registered trademark). As an example, the short-distance wireless communication unit 27 uses a beacon compatible with the BLE (Bluetooth Low Energy) communication standard to receive a radio wave from the portable terminal 50. The short-distance wireless communication unit 27 is connected to the chipset 21. The short-distance wireless communication unit 27 transmits and receives data to and from the CPU 11 through the chipset 21.

The short-distance wireless communication unit 27 is also connected to the embedded controller 31. For example, the short-distance wireless communication unit 27 is connected to a digital input terminal of the embedded controller 31, and when receiving the loss prevention tag from the portable terminal 50 using the beacon, the short-distance wireless communication unit 27 outputs, to the embedded controller 31, information indicating that the loss prevention tag is received.

The speaker 32 is connected to the audio codec 24 to output a sound based on sound data decoded by the audio codec 24.

The operation unit 33 is configured to include a keyboard, a touch pad, a power button, and the like. The operation unit 33 outputs, to the embedded controller 31, an operation signal based on a user operation. Note that the operation unit 33 may also include an external device connected through the USB connector 26 or the like. As the external device, there is a keyboard, a mouse, a touch pad, or the like.

The power button 34 is an operator to turn on the power of the information processing apparatus 10. For example, the power button 34 outputs, to the embedded controller 31, an operation signal according to a user operation.

The power supply circuit 35 is configured, for example, to include a DC/DC converter, a charge/discharge unit, an AC/DC adapter, and the like. For example, the power supply circuit 35 converts DC voltage supplied from an external power supply through the AC/DC adapter or supplied from a battery into plural voltages required to operate the information processing apparatus 10. Further, the power supply circuit 35 supplies power to each unit of the information processing apparatus 10 under the control of the embedded controller 31.

The embedded controller (EC) 31 is a processor provided separately from the CPU 11 that executes processing of the OS or the BIOS. The embedded controller 31 includes a CPU, a ROM, a RAM, a flash memory, multi-channel A/D input terminal and D/A output terminal, a timer, and digital input/output terminals, which are not illustrated. To the embedded controller 31, for example, the audio codec 24, the operation unit 33, the power button 34, the power supply circuit 35, and the like are connected through respective input terminals. Further, the embedded controller 31 receives and sends data from and to the CPU 11 via the chipset 21 connected through a bus.

For example, when acquiring an operation signal according to a user operation on the power button 34, the embedded controller 31 performs control of the power supply circuit 335, gives a system boot instruction to the CPU 11, or the like. Further, when acquiring, from the short-distance wireless communication unit 27, the information indicating that the loss prevention tag is received from the portable terminal 50, the embedded controller 31 performs control to output a beep sound from the speaker 32.

Note that some of the units described with reference to FIG. 2 may also be configured as a SoC (System on a Chip) integrated on one chip. As an example, a SoC 100 illustrated is configured to include the CPU 11, the main memory 12, the chipset 21, and the nonvolatile memory 22.

Next, a configuration in which the information processing apparatus 10 performs control to output a beep sound by remote control using short-distance wireless communication from the portable terminal 50 (hereinafter called "remote beep control") will be described in detail.

[Configuration of Remote Beep Control]

Figure 3:
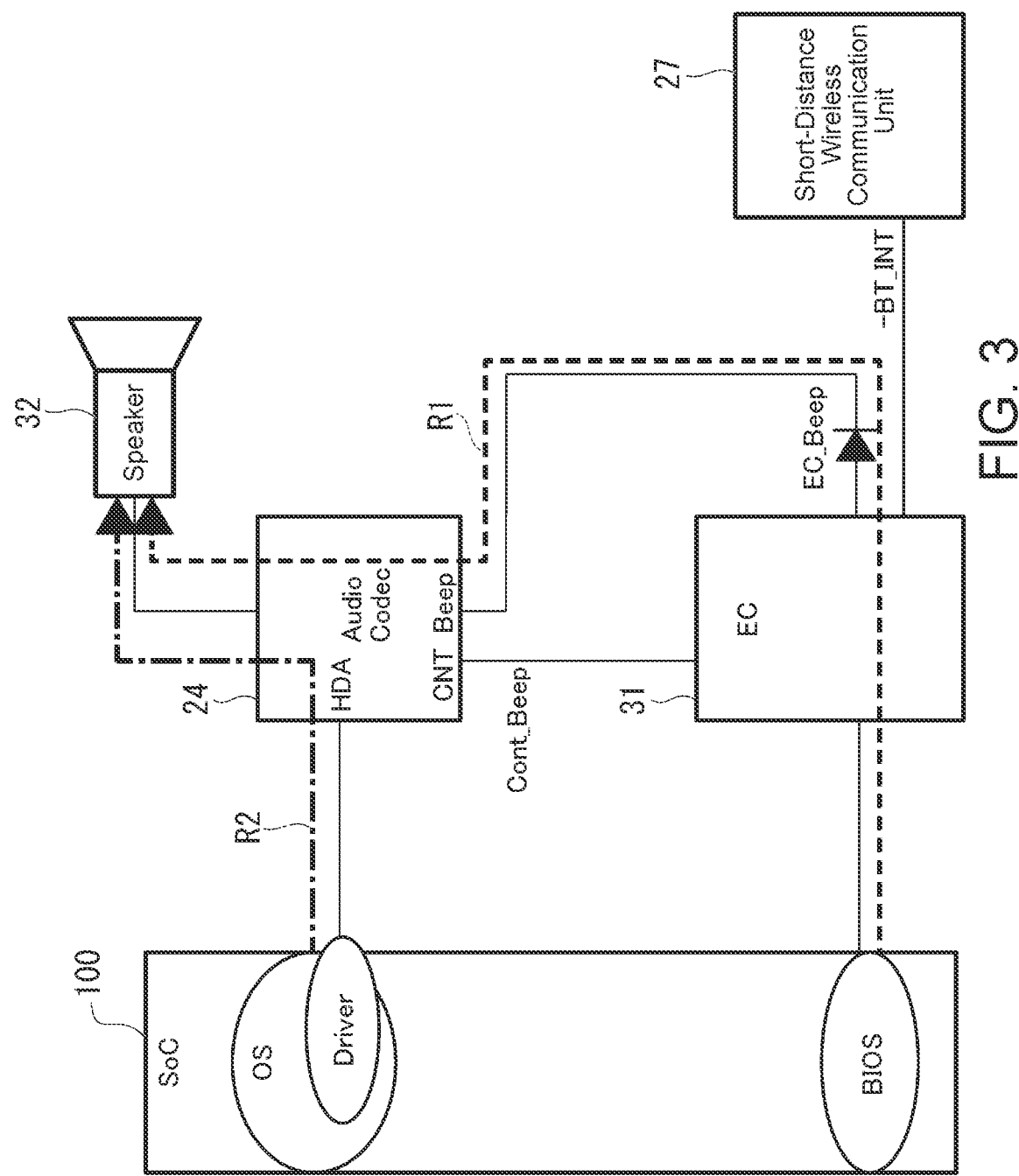
FIG. 3 is a block diagram illustrating an example of a configuration for performing remote beep control according to the first embodiment.

FIG. 3 is a block diagram illustrating an example of the configuration for performing remote beep control according to the present embodiment. FIG. 3 illustrates a configuration related to remote beep control in the configuration illustrated in FIG. 2.

The audio codec 24 is connected to the SoC 100 by a HDA (High Definition Audio) bus to transmit and receive data under the control of an audio driver running on the OS.

When the OS (system) is in the normal operating state, audio data output from the SoC 100 by processing based on the OS is input to an HDA terminal of the audio codec 24 through the HDA bus.

The audio data output from the SoC 100 is sound data output by the OS processing, sound data output by processing of an application running on the OS, or the like. Further, the normal operating state is a state in which the OS is booted to make the above-mentioned audio-related processing executable, which corresponds, for example, to working state "S0" (non-sleep state) defined in the ACPI (Advanced Configuration and Power Interface) specification.

The short-distance wireless communication unit 27 transmits and receives data to and from the CPU 11 through the chipset 21. For example, the short-distance wireless communication unit 27 performs communication with an external device (for example, the portable terminal 50) using a short-range wireless link by processing of the BIOS or the OS executed by the CPU 11. As an example, the short-distance wireless communication unit 27 uses the beacon compatible with the BLE communication standard to receive a radio wave from the portable terminal 50.

The short-distance wireless communication unit 27 is further connected to a digital input terminal of the embedded controller 31, and when receiving the loss prevention tag from the portable terminal 50, the short-distance wireless communication unit 27 outputs a "−BT_INT" signal indicating that the loss prevention tag is received.

When acquiring the "−BT_INT" signal output from the short-distance wireless communication unit 27, the embedded controller 31 performs control to output a beep sound from the speaker 32. For example, when acquiring the "−BT_INT" signal, the embedded controller 31 notifies the BIOS running on the SoC 100 to output a beep signal (EC_Beep) in accordance with an instruction from the BIOS. The beep signal is, for example, a PWM signal having a predetermined frequency (a frequency of the beep sound). Note that the embedded controller 31 and the SoC are connected, for example, by an eSPI (Enhanced Serial Peripheral Interface).

Note that when acquiring the "−BT_INT" signal, the embedded controller 31 may also output the beep signal (EC_Beep) without notifying the BIOS.

The beep signal (EC_Beep) output from the embedded controller 31 is input to a beep terminal (Beep) of the audio codec 24. In FIG. 3, an arrow path indicated by R1 is a path along which the beep sound is output from the speaker 32 under the control of the embedded controller 31. On the other hand, in FIG. 3, an arrow path indicated by R2 is a path along which the sound is output from the speaker 32 under the control of the SoC 100 (audio driver) described above.

The audio codec 24 exclusively switches between the beep sound based on the beep signal output from the embedded controller 31 and the sound based on the audio data output from the SoC 100 to output either one of the sounds from the speaker 32. Here, in the normal operating state (for example, "S0"), the resources of the audio codec 24 are occupied under the control of the SoC 100 (audio driver), and the path (the arrow path indicated by R2) to output the sound from the speaker 32 is used. Note that even in an operating state "S0ix" supported by a CPU in the Intel (registered trademark) system, the resources of the audio codec 24 are occupied under the control of the SoC 100 (audio driver) in the same manner. Therefore, there is a need to switch the resources of the audio codec 24 in order to output the beep sound from the speaker 32 under the control of the embedded controller 31.

Therefore, when acquiring the "−BT_INT" signal, the embedded controller 31 outputs a control signal ("Cont_Beep" signal) to switch the sound to be output from the speaker 32 to the beep sound based on the beep signal output from the embedded controller 31. This control signal is input to a control terminal (CNT) of the audio codec 24. The control terminal is, for example, a terminal compatible with the I2S (Inter-IC Sound) standard.

Based on this "Cont_Beep" signal, the audio codec 24 switches the sound to be output from the speaker 32 to the beep sound based on the beep signal output from the embedded controller 31. Here, the "Cont_Beep" signal when the sound to be output from the speaker 32 is switched to the beep sound based on the beep signal output from the embedded controller 31 is called a "Cont_Beep(ON)" signal. On the other hand, the "Cont_Beep" signal when the sound to be output from the speaker 32 is switched to the sound based on the audio data output from the SoC 100 is called a "Cont_Beep(OFF)" signal.

Specifically, for example, the audio codec 24 makes a request to the SoC 100 (audio driver) for switching control of the sound to be output from the speaker 32 based on the "Cont_Beep" signal. In response to the switching control request from the audio codec 24, the SoC 100 (audio driver) instructs the audio codec 24 to switch the sound to be output from the speaker 32. In accordance with this instruction from the SoC 100 (audio driver), the audio codec 24 switches the sound to be output from the speaker 32 from the sound based on the audio data output from the SoC 100 to the beep sound based on the beep signal output from the embedded controller 31 or vice versa.

[Operation of Remote Beep Control Processing]

Next, the operation of remote beep control processing in which the information processing apparatus 10 outputs the beep sound as a result of receiving the loss prevention tag from the portable terminal 50 will be described.

Figure 4:
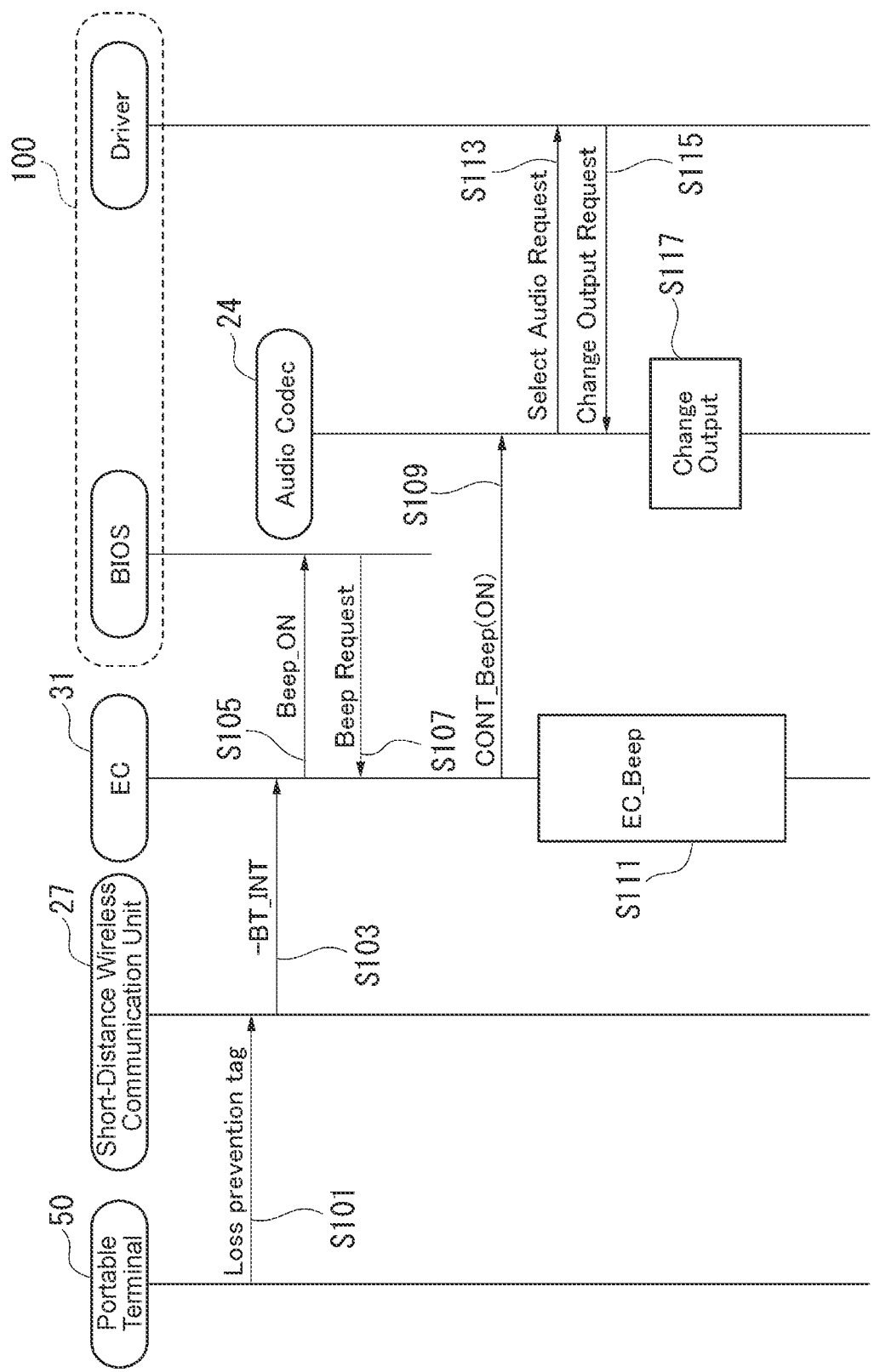
FIG. 4 is a flowchart illustrating an example of remote beep control processing according to the first embodiment.

FIG. 4 is a flowchart illustrating an example of remote beep control processing according to the present embodiment.

(Step S101) When the short-distance wireless communication unit 27 receives the loss prevention tag transmitted from the portable terminal 50, the procedure proceeds to a process in step S103.

(Step S103) When receiving the loss prevention tag, the short-distance wireless communication unit 27 outputs the "−BT_INT" signal indicating that the loss prevention tag is received. Then, the procedure proceeds to a process in step S105.

(Step S105) When acquiring the "−BT_INT" signal, the embedded controller 31 transmits, to the SoC 100 (BIOS), a "Beep_ON" signal as a trigger to output the beep sound. Then, the procedure proceeds to a process in step S107.

(Step S107) When acquiring the "Beep_ON" signal from the embedded controller 31, the SoC 100 (BIOS) transmits, to the embedded controller 31, a "Beep Request" signal to request the output of the beep signal. Then, the procedure proceeds to a process in step S109.

(Step S109) When acquiring the "Beep Request" signal from the SoC 100 (BIOS), the embedded controller 31 transmits, to the audio codec 24, the "Cont_Beep(ON)" signal for switching the sound to be output from the speaker 32 to the beep sound based on the beep signal output from the embedded controller 31. Then, the procedure proceeds to a process in step S111.

(Step S111) Further, when acquiring the "Beep Request" signal from the SoC 100 (BIOS), the embedded controller 31 starts outputting the beep signal (EC_Beep). Note that the order of the processes in step S109 and step S111 may also be reversed. Then, the procedure proceeds to a process in step S113.

(Step S113) When acquiring the "Cont_Beep(ON)" signal from the embedded controller 31, the audio codec 24 transmits, to the SoC 100 (audio driver), a "Select Beep Request" signal to request control to switch the sound to be output from the speaker 32 to the beep sound. Then, the procedure proceeds to a process in step S115.

(Step S115) When acquiring the "Select Beep Request" signal from the audio codec 24, the SoC 100 (audio driver) transmits, to the audio codec 24, a "Change Output Request" signal to request to switch the output of the audio codec 24. Then, the procedure proceeds to a process in step S117.

(Step S117) When acquiring the "Change Output Request" signal from the SoC 100 (audio driver), the audio codec 24 switches the sound to be output from the speaker 32 from the sound based on the audio data output from the SoC 100 to the beep sound based on the beep signal output from the embedded controller 31.

Note that when acquiring the "−BT_INT" signal, the embedded controller 31 may also output the "Cont_Beep (ON)" signal and the beep signal (EC_Beep) under the own control of the embedded controller 31 without transmitting, to the SoC 100 (BIOS), the "Beep_ON" signal as the trigger to output the beep sound.

Further, when acquiring the "Cont_Beep(ON)" signal, the audio codec 24 may also switch the sound to be output from the speaker 32 from the sound based on the audio data output from the SoC 100 to the beep sound based on the beep signal output from the embedded controller 31 under the own control of the audio codec 24 without transmitting the "Select Beep Request" signal to the SoC 100 (audio driver).

[Operation of Stop Processing of Remote Beep Control]

When outputting the beep sound by remote beep control, the information processing apparatus 10 continues control to output the beep sound until a predetermined condition is satisfied. The predetermined condition is, for example, that a certain amount of time passes, any operation is performed on the information processing apparatus 10, or the like. Here, this predetermined condition is called a "beep stop condition." The operation of processing when stopping the output of the beep sound output by remote beep control will be described below.

Figure 5:
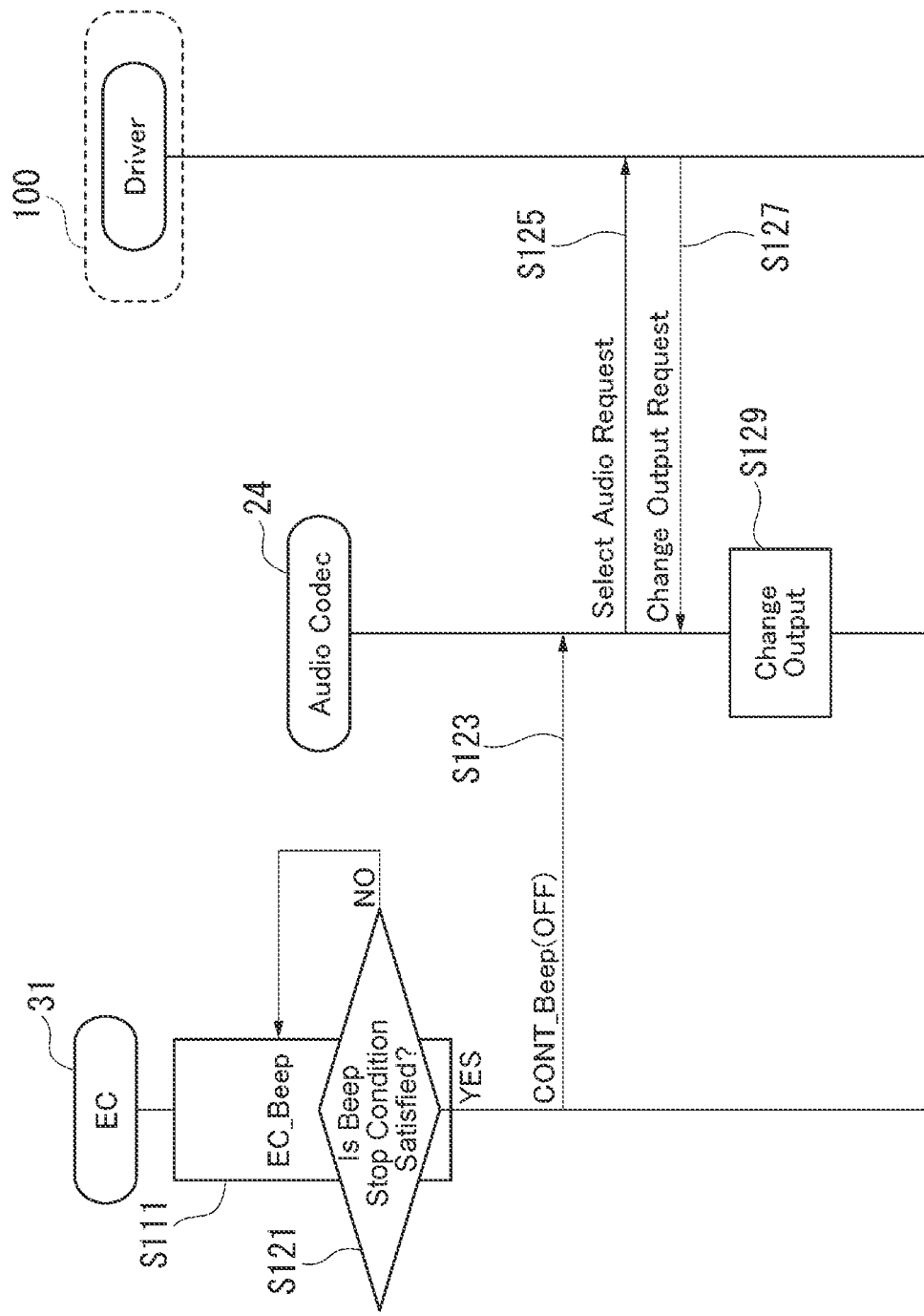
FIG. 5 is a flowchart illustrating an example of stop processing of remote beep control according to the first embodiment.

FIG. 5 is a flowchart illustrating an example of stop processing of remote beep control according to the present embodiment. The processing illustrated in FIG. 5 is performed on the assumption that the output of the beep signal (EC_Beep) in step S111 of FIG. 4 is already started.

(Step S121) The embedded controller 31 determines whether or not the beep stop condition is satisfied. For example, the embedded controller 31 uses an internal timer to count the time from the start of the output of the beep sound, and determines that the beep stop condition is satisfied when the certain amount of time has passed. Alternatively, the embedded controller 31 may also determine that the beep stop condition is satisfied when acquiring an operation signal from the operation unit 33. When determining that the beep stop condition is not satisfied (NO), the embedded controller 31 continuously outputs the beep signal (EC_Beep) the output of which is started in step S111 of FIG. 4. On the other hand, when determining that the beep stop condition is satisfied (YES), the embedded controller 31 stops the output of the beep signal (EC_Beep), and the procedure proceeds to a process in step S123.

(Step S123) The embedded controller 31 transmits, to the audio codec 24, the "Cont_Beep(OFF)" signal to switch the sound to be output from the speaker 32 from the beep sound based on the beep signal output from the embedded controller 31 to the sound based on the audio data output from the SoC 100. Then, the procedure proceeds to a process in step S125.

(Step S125) When acquiring the "Cont_Beep(OFF)" signal from the embedded controller 31, the audio codec 24 transmits, to the SoC 100 (audio driver), a "Select Audio Request" signal to request control to switch the sound to be output from the speaker 32 to the sound based on the audio data. Then, the procedure proceeds to a process in step S127.

(Step S127) When acquiring the "Select Audio Request" signal from the audio codec 24, the SoC 100 (audio driver) transmits, to the audio codec 24, the "Change Output Request" signal to request to switch the output of the audio codec 24. Then, the procedure proceeds to a process in step S129.

(Step S129) When acquiring the "Change Output Request" signal from the SoC 100 (audio driver), the audio codec 24 switches the sound to be output from the speaker 32 to the sound based on the audio data output from the SoC 100.

Note that either control to stop the output of the beep signal (EC_Beep) or control to transmit the "Cont_Beep (OFF)" signal by the embedded controller 31 may come first.

Further, when acquiring the "Cont_Beep(OFF)" signal, the audio codec 24 may switch the sound to be output from the speaker 32 to the sound based on the audio data output from the SoC 100 under the own control of the audio codec 24 without transmitting the "Select Audio Request" signal to the SoC 100 (audio driver).

[Summary of First Embodiment]

As described above, the information processing apparatus 10 according to the present embodiment includes: the main memory 12 (an example of a memory) which temporarily stores a program of the OS; the SoC 100 (an example of a processor) which executes the program of the OS; the speaker 32 which output a sound; the short-distance wireless communication unit 27 which performs short-distance wireless communication (for example, a beacon); the audio codec 24 (an example of an audio processing device); and the embedded controller 31. When receiving the loss prevention tag (an example of a specific signal) by short-distance wireless communication, the short-distance wireless communication unit 27 outputs the "−BT_INT" signal (an example of first information) indicating that the loss prevention tag is received. In response to acquiring the "−BT_INT" signal from the short-distance wireless communication unit 27, the embedded controller 31 outputs the beep signal (an example of first sound data) to output the beep sound. The audio codec 24 has a terminal to which the beep signal output from the embedded controller 31 is input, and a terminal to which the audio data (an example of second sound data) output from the SoC 100 by processing based on the OS is input. The audio codec 24 exclusively switches between the beep sound based on the beep signal and the sound based on the audio data to output either one of the sounds from the speaker 32. Then, when acquiring the "−BT_INT" signal output from the short-distance wireless communication unit 27, the embedded controller 31 performs control to cause the audio codec 24 to output, from the speaker 32, the beep sound based on the beep signal.

Thus, even when the system operating state of the information processing apparatus 10 is, for example, "$S_0$" or "S0ix" state, the information processing apparatus 10 can output the beep sound by remote control using the existing speaker 32. Therefore, the information processing apparatus 10 can output a sound by remote control using the existing speaker 32 regardless of the system operating state.

For example, when acquiring the "−BT_INT" signal output from the short-distance wireless communication unit 27, the embedded controller 31 outputs the "Cont_Beep (ON)" signal (an example of a control signal) to switch the sound to be output from the speaker 32 from the sound based on the audio data to the beep sound based on the beep signal. The audio codec 24 has a control terminal (an example of a control terminal) to which the "Cont_Beep(ON)" signal output from the embedded controller 31 is input, and switches the sound to be output from the speaker 32 based on the "Cont_Beep(ON)" signal from the sound based on the audio data to the beep sound based on the beep signal.

Thus, even when the system operating state of the information processing apparatus 10 is, for example, "S0" or "S0ix" state, the information processing apparatus 10 can output the beep sound by remote control using the existing speaker 32 by switching the resources of the audio codec 24 under the control of the embedded controller 31.

The control terminal of the audio codec 24 is, for example, a terminal compatible with the I2S (Inter-IC Sound) standard. Further, as an example, this control terminal may be a jack detection terminal that detects the insertion of an earphone plug into an earphone jack.

Thus, even when the system operating state of the information processing apparatus 10 is, for example, "S0" or "S0ix" state, the information processing apparatus 10 can control the general-purpose terminal of the audio codec 24 to make the beep sound by remote control.

Further, based on the "Cont_Beep(ON)" signal, the audio codec 24 makes a request to the SoC 100 for switching control to switch the sound to be output from the speaker 32 to the beep sound. For example, the audio codec 24 transmits, to the SoC 100, the "Select Beep Request" signal as this request for switching control. In response to the request for switching control from the audio codec 24, the SoC 100 instructs the audio codec 24 to switch the sound to be output from the speaker 32 from the sound based on the audio data to the beep sound based on the beep signal. For example, as the instruction to switch to the beep sound, the SoC 100 transmits, to the audio codec 24, the "Change Output Request" signal to request the audio codec 24 to switch output. Then, in accordance with the above instruction from the SoC 100, the audio codec 24 switches the sound to be output from the speaker 32 from the sound based on the audio data to the beep sound based on the beep signal.

Thus, even when the system operating state of the information processing apparatus 10 is, for example, "S0" or "S0ix" state, the information processing apparatus 10 can output the beep sound by remote control using the existing speaker 32 by the SoC 100 (for example, the audio driver) switching the resources of the audio codec 24 under the control of the embedded controller 31.

Further, in response to acquiring the "−BT_INT" signal output from the short-distance wireless communication unit 27, the embedded controller 31 outputs, to the SoC 100, the "Beep_ON" signal (an example of second information) as the trigger to output the beep sound. When acquiring the "Beep_ON" signal output from the embedded controller 31, the SoC 100 instructs the embedded controller 31 to output the beep signal. For example, as the instruction to output the beep signal, the SoC 100 transmits, to the embedded controller 31, the "Beep Request" signal to request the embedded controller 31 to output the beep signal. Then, in accordance with the instruction from the SoC 100 to output the beep signal, the embedded controller 31 outputs the beep signal (EC_Beep).

Thus, when receiving the instruction (for example, the loss prevention tag of the beacon) to output the beep sound by remote control, the information processing apparatus 10 causes the embedded controller 31 to notify the SoC 100 (for example, BIOS) in order to be able to switch the resources of the audio codec 24 under the control of the embedded controller 31 in accordance with the instruction from the SoC 100 (for example, BIOS). Therefore, even when the system operating state of the information processing apparatus 10 is, for example, "S0" or "S0ix" state, the information processing apparatus 10 can output the beep sound by remote control using the existing speaker 32.

Further, after outputting the "Cont_Beep(ON)" signal to switch the sound to be output from the speaker 32 from the sound based on the audio data to the beep sound based on the beep signal, when the beep stop condition (an example of a predetermined condition) is satisfied, the embedded controller 31 outputs the "Cont_Beep(OFF)" signal (another example of the control signal) to switch the sound to be output from the speaker 32 from the beep sound based on the beep signal to the sound based on the audio data.

Thus, after outputting the beep sound by remote control, when the certain amount of time has passed, or when there was an operation input by the user, the information processing apparatus 10 can stop the output of the beep sound.

Further, a control method for the information processing apparatus 10 according to the present embodiment is a control method for the information processing apparatus 10 including: the main memory 12 (the example of the memory) which temporarily stores a program of the OS; the SoC 100 (the example of the processor) which executes the program of the OS; the speaker 32 which output a sound; the short-distance wireless communication unit 27 which performs short-distance wireless communication (for example, the beacon); the audio codec 24 (the example of the audio processing device); and the embedded controller 31, the control method including: a step of causing the short-distance wireless communication unit 27 to output the "−BT_INT" signal (the example of first information) indicating that the loss prevention tag is received when receiving the loss prevention tag (the example of the specific signal) by short-distance wireless communication; a step of causing the embedded controller 31 to output the beep signal (the example of first sound data) in order to output a sound in response to acquiring the "−BT_INT" signal output from the short-distance wireless communication unit 27; a step of causing the audio codec 24 to switch exclusively between the beep sound based on the beep signal and the sound based on the audio data in order to output either one of the sounds from the speaker 32, where the audio codec 24 has a terminal to which the beep signal is input and a terminal to which the audio data (the example of second sound data) output from the SoC 100 by processing based on the OS is input; and a step in which when acquiring the "−BT_INT" signal output from the short-distance wireless communication unit 27, the embedded controller 31 performs control to cause the audio codec 24 to output, from the speaker 32, the beep sound based on the beep signal.

Thus, even when the system of the information processing apparatus 10 is in the normal operating state (for example, "S0" or "S0ix" state), the information processing apparatus 10 can output the beep sound by remote control using the existing speaker 32. Therefore, the information processing apparatus 10 can output a sound by remote control using the existing speaker 32 regardless of the system operating state.

Second Embodiment

In this embodiment, another example of the configuration related to remote beep control will be described.

Figure 6:
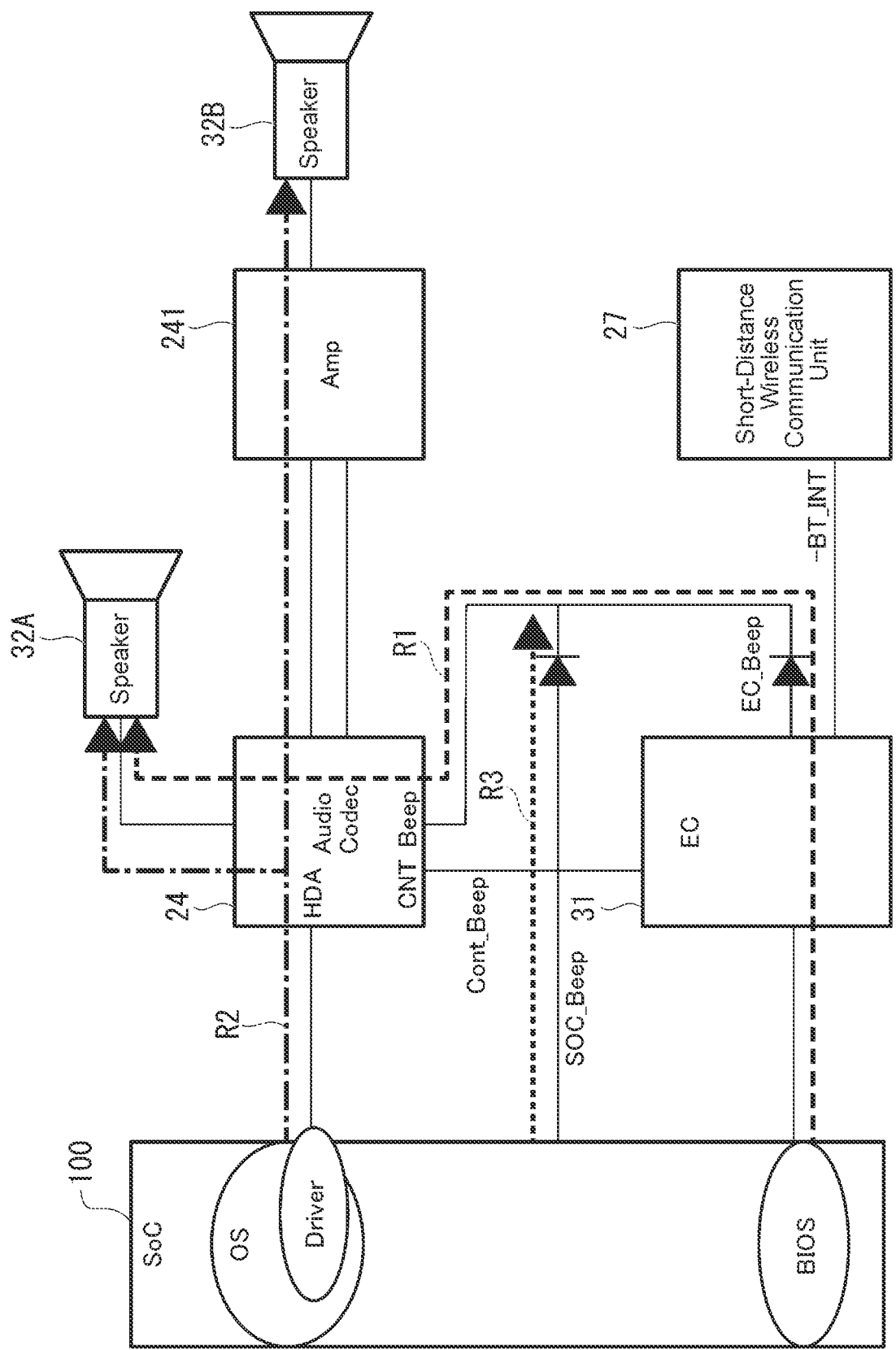
FIG. 6 is a block diagram illustrating another example of the configuration for performing remote beep control according to a second embodiment.

FIG. 6 is a block diagram illustrating another example of the configuration to perform remote beep control according to the present embodiment. In FIG. 6, components corresponding to respective units in FIG. 3 are given the same reference numerals.

The present embodiment is different from the first embodiment in that two speakers are so included that the audio codec 24 outputs the sound based on the audio data output from the SoC 100. The path (the arrow path indicated by R2) along which the sound based on the audio data output from the SoC 100 is output from the speaker is divided into paths to two speakers, that is, a speaker 32A and a speaker 32B, respectively. The speaker 32A corresponds to the speaker 32 in FIG. 3. On the other hand, the speaker 32B is connected to the audio codec 24 through an amplifier 241. The speaker 32B can output a higher quality sound than the speaker 32A by going through the amplifier 241.

Thus, even in the configuration with the two speakers of the speaker 32A and the speaker 32B provided therein, the resources of the audio codec 24 can be switched in the same manner as in the first embodiment to output the beep sound from the speaker 32A as remote beep control.

Further, the configuration illustrated in FIG. 6 is different from the configuration in the first embodiment in that a beep signal (SoC_Beep) is also output from the SoC 100. Like the beep signal (EC_Beep) output from the embedded controller 31, this beep signal (SoC_Beep) is input to the beep terminal of the audio codec 24. The beep signal (SoC_Beep) is output when updating the BIOS or the like, which is not output in "S0" or "S0ix" state. Therefore, the beep signal (SoC_Beep) does not affect the remote beep control in "S0" or "S0ix" state.

While the respective embodiments of this invention have been described in detail above with reference to the accompanying drawings, the specific configurations are not limited to the above-described embodiments, and design changes are included without departing from the scope of this invention. For example, the respective configurations described above in the respective embodiments can be combined arbitrarily.

Further, in the aforementioned embodiments, the example in which the information processing apparatus 10 outputs the beep sound in response to receiving the loss prevention tag from the portable terminal 50, but any notification sound other than the beep sound may also be output, and the type of notification sound can be any sound type.

Further, the embedded controller 31 may make a request to the SoC 100 for switching control of the sound to be output from the speaker 32 instead of outputting the "Cont_Beep" signal to the audio codec 24. In this case, in response to the request for switching control from the embedded controller 31, the SoC 100 (audio driver) may instruct the audio codec 24 to switch the sound to be output from the speaker 32 from the sound based on the audio data output from the SoC 100 to the beep sound based on the beep signal output from the embedded controller 31.

Note that the information processing apparatus 10 described above has a computer system therein. Then, a program for implementing the function of each component included in the information processing apparatus 10 described above may be recorded on a computer-readable recording medium so that the program recorded on this recording medium is read into the computer system and executed to perform processing in each component included in the information processing apparatus 10 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computer devices connected through networks including the Internet, WAN, LAN, and a communication line such as a dedicated line. Further, the "computer-readable recording medium" means a storage medium such as a portable medium like a flexible disk, a magneto-optical disk, a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 10, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 10 in the embodiments described above may be realized as an integrated circuit such as LSI (Large Scale Integration). Each function may be implemented as a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

DESCRIPTION OF SYMBOLS 1 information processing system
10 information processing apparatus
11 CPU
12 main memory
13 video subsystem
14 display unit
21 chipset
22 nonvolatile memory
23 storage medium
24 audio codec
25 LAN adapter
26 USB connector
27 short-distance wireless communication unit
31 embedded controller 32 (32A, 32B) speaker
33 operation unit
34 power button
35 power supply circuit
100 SoC
241 amplifier

What is claimed is:

1. An information processing apparatus comprising:
a memory which temporarily stores a program of an Operating System (OS);
a processor which executes the program of the OS;
a speaker which outputs sound;
a short-distance wireless communication unit which outputs first information indicating that a specific signal is received when receiving the specific signal by short-distance wireless communication;
an EC (Embedded Controller) which outputs first sound data to output a first sound in response to acquiring the first information output from the short-distance wireless communication unit; and
an audio processing device having a terminal to which the first sound data output from the EC is input and a terminal to which second sound data output from the processor by processing based on the OS is input to switch exclusively between the first sound based on the first sound data and a second sound based on the second sound data in order to output either the first sound or the second sound from the speaker,
wherein upon acquiring the first information output from the short-distance wireless communication unit, the EC causes the audio processing device to output the first sound from the speaker.

2. The information processing apparatus according to claim 1, wherein
when acquiring the first information output from the short-distance wireless communication unit, the EC outputs a control signal to switch the sound to be output from the speaker from the second sound to the first sound, and
the audio processing device has a control terminal to which the control signal output from the EC is input, and based on the control signal, the audio processing device switches the sound to be output from the speaker from the second sound to the first sound.

3. The information processing apparatus according to claim 2, wherein the control terminal is a terminal compatible with I2S (Inter-IC Sound) standard.

4. The information processing apparatus according to claim 3, wherein
the audio processing device makes a request to the processor for switching control based on the control signal,
the processor instructs the audio processing device to switch the sound to be output from the speaker from the second sound to the first sound in response to the request for the switching control from the audio processing device, and
in accordance with the instruction from the processor, the audio processing device switches the sound to be output from the speaker from the second sound to the first sound.

5. The information processing apparatus according to claim 4, wherein
the EC outputs second information to the processor in response to acquiring the first information output from the short-distance wireless communication unit,
the processor instructs the EC to output the first sound data in response to acquiring the second information output from the EC, and
in accordance with the instruction to output the first sound data from the processor, the EC outputs the first sound data.

6. The information processing apparatus according to claim 5, wherein after outputting the control signal to switch the sound to be output from the speaker from the second sound to the first sound, when a predetermined condition is satisfied, the EC outputs a control signal to switch the sound to be output from the speaker from the first sound based on the first sound data to the second sound.

7. A control method for an information processing apparatus including: a memory which temporarily stores a program of an Operating System (OS); a processor which executes the program of the OS; a speaker which outputs sound; a short-distance wireless communication unit; an audio processing device; and an EC (Embedded Controller), the control method comprises:
causing the short-distance wireless communication unit to output first information indicating that a specific signal is received when receiving the specific signal by short-distance wireless communication;
causing the EC to output first sound data in order to output a first sound in response to acquiring the first information output from the short-distance wireless communication unit;
causing the audio processing device to switch exclusively between the first sound based on the first sound data and a second sound based on second sound data in order to output either of the first sound or the second sound from the speaker, where the audio processing device has a terminal to which the first sound data output from the EC is input and a terminal to which the second sound data output from the processor by processing based on the OS is input; and
acquiring the first information output from the short-distance wireless communication unit, wherein the EC performs control to cause the audio processing device to output, from the speaker, the first sound.

* * * * *